Feb. 21, 1939.     R. HOUWINK     2,148,201
ELECTRICAL INSULATING MATERIAL AND METHOD OF MAKING SAME
Filed March 5, 1936

INVENTOR
ROELOF HOUWINK
ATTORNEY

Patented Feb. 21, 1939

2,148,201

UNITED STATES PATENT OFFICE 2,148,201

ELECTRICAL INSULATING MATERIAL AND METHOD OF MAKING SAME

Roelof Houwink, Eindhoven, Netherlands, assignor to N. V. Philips' Gloeilampenfabrieken, Eindhoven, Netherlands Application March 5, 1936, Serial No. 67,375
In Germany April 2, 1935

2 Claims. (Cl. 18—59)

My invention relates to plate-shaped electrical insulating material, and more particularly to insulating material containing a resin.

To meet different electrical and mechanical requirements, various types of insulating materials are made from resins such as polystyrene or resins capable of being hardened under heat and pressure. For example, a resin capable of being hardened may be mixed with a pulverized filling material to form a molding material which can be pressed under heat in a suitable mold to produce objects having intricate shapes.

By a "molding material" as used herein is to be understood to mean a material which, when pressed in a mold with the application of heat, is brought into a flowing condition whereby it will completely fill the mold even if the mold has an intricate shape.

The objects produced from such molding material usually have high electrical insulating properties, as the particles of the filling material are separated by particles of the resin, and in addition may have a low moisture-absorption capacity. Furthermore, by using different filling materials, such as pulverized graphite, asbestos or mica, the molding material can be given definite electrical properties.

For other purposes, fibrous layers for instance of paper or cotton fabric are treated—preferably impregnated—with a binder, and this material is pressed under heat into a sheet or plate of insulating material. Such materials, which are manufactured under various trade names, such as "Presspan", "Pertinax", "Textolite", have many advantages for use in the mass production of electrical apparatus, as they can be readily machined, for instance cut or stamped, and the objects made therefrom have high mechanical strength. Such material can not be considered as a molding material as above defined, as they do not have such marked flowing properties. Although such fibrous insulating materials have several disadvantages, their use in many instances is more advantageous than the use of molding materials. For instance, in mass production it is often necessary to produce in a given time a greater number of pieces than can be molded in a single mold from molding material. In such cases it is much cheaper to stamp the pieces from a plate of fibrous material, as a plurality of expensive molds would be required to mold the same number of pieces in the same time.

The use of such fibrous material, however, has the drawback that the insulating capacity of the pieces produced therefrom is generally lower than that of pieces molded from a molding material, and is mostly particularly low in the direction of the fibrous material. Furthermore, such fibrous materials usually have a relatively high moisture-absorption capacity, which decreases their insulation capacity, and also causes undesired expansion.

The object of my invention is to produce a plate-shaped electrical insulating material which combines the electrical advantages of molding material and the mechanical advantages of a fibrous material without having any of their disadvantages.

In accordance with the invention, I form such material from portions of molding materials and portions of fibrous material.

More particularly, I provide apertures at desired points in a plate of insulating material formed of fibrous material and a resin capable of being hardened, and into these apertures I place a suitable quantity of a molding material. The plate comprising layers of fibrous material with molding material inserted therein is then pressed under heat to form a composite body of two types of insulating material.

In order that my invention may be clearly understood and readily carried into effect, I shall describe the same more fully with reference to the accompanying drawing, in which.

Figure 1:
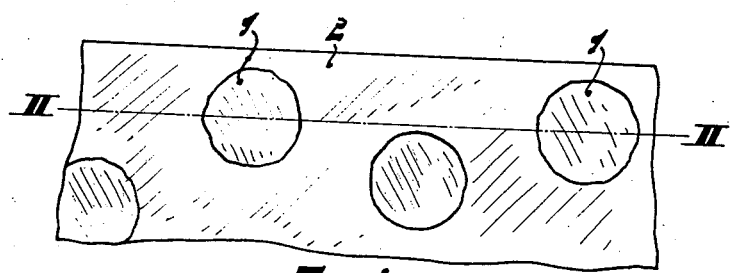
Figure 1 is a plan view of a composite plate of insulating material according to the invention.
Figure 2:
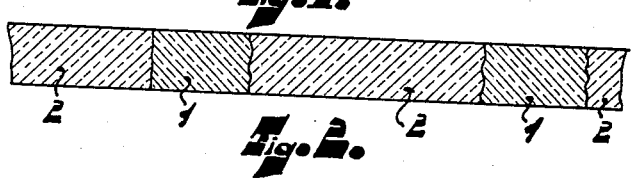
Fig. 2 is a sectionized view taken along the line II—II of Figure 1.

The composite plate shown in Figs. 1 and 2 comprises a plate 2 formed of layers of fibrous materials, for instance paper or cotton fabric, treated—preferably impregnated—with a resin capable of being hardened. Provided at desired points in the plate 2 are a plurality of apertures, which are filled with a suitable molding material 1 consisting of a mixture of a resin capable of being hardened and a pulverized filling material, such as mentioned hereabove. With the materials so arranged, they are pressed under heat to form the composite plate, as shown.

The portions 1 have all the desirable electrical insulating advantages of the molding material, whereas the plate 2 has the mechanical advantages of the fibrous material.

Figure 3:
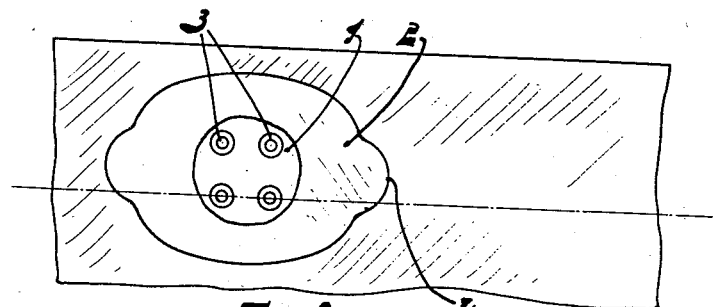
Fig. 3 is a plan view of a composite plate of insulating material showing another embodiment of my invention.
Figure 4:
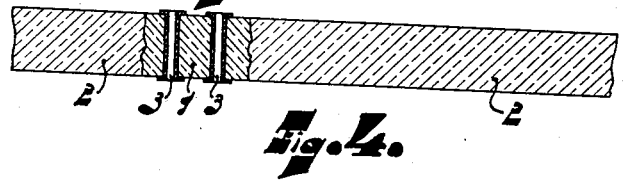
Fig. 4 is a sectionized view taken along the line IV—IV of Fig. 3.

As shown in Figs. 3 and 4, metal members 3, such as terminals, sockets, bushings, etc., are molded as inserts in the portion 1, and are thus well insulated from each other. A composite plate-shaped body of any desired shape may be produced as a stamping, for instance by stamping along the line 4. In such a piece the members 3 are properly insulated by the molding material of portion 1, whereas the surrounding portion 2 gives the piece a high mechanical strength and allows the stamping to take place.

While I have described my invention in connection with specific examples and in specific applications, I do not wish to be limited thereto, but desire the appended claims to be construed as broadly as permissible in view of the prior art.

What I claim is:

1. A method of making a plate-shaped composite body of high mechanical strength and electrical insulating properties, comprising the steps of forming an aperture in a plate of fibrous molded material of high mechanical strength, filling the aperture with a moldable material of lower mechanical strength and higher electrical insulating properties than the material of the plate, placing within said moldable material a metal member to serve as an electric conductor, and pressing the material to form the plate-shaped body with said member molded within said moldable material and insulated thereby.

2. A molded plate-shaped electrical insulating body comprising a plate-shaped portion consisting of layers of fibrous material containing a hardened resin, an insert of a molded material of higher electrical insulating properties and lower mechanical strength than the material of said plate-shaped portion, and a metal member embedded in said insert and insulated thereby from said plate-shaped portion.

ROELOF HOUWINK.